(12) United States Patent
Ansari

(10) Patent No.: US 7,908,294 B2
(45) Date of Patent: Mar. 15, 2011

(54) INTEROPERABLE MANAGEMENT OF APPLICATION SERVERS

(75) Inventor: Akbar Ali Ansari, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 382 days.

(21) Appl. No.: 11/340,754

(22) Filed: Jan. 26, 2006

(65) Prior Publication Data
US 2007/0174439 A1    Jul. 26, 2007

(51) Int. Cl.
*G06F 17/30* (2006.01)
(52) U.S. Cl. .................................. 707/792; 707/826
(58) Field of Classification Search .............. 707/103 R, 707/792, 826; 709/203, 217, 223
See application file for complete search history.

(56) References Cited

U.S. PATENT DOCUMENTS

| | | | |
|---|---|---|---|
| 7,310,742 B2* | 12/2007 | Zimmer et al. .................... 714/5 |
| 7,321,929 B2* | 1/2008 | Rolfe ............................. 709/223 |
| 7,467,384 B2* | 12/2008 | Brubacher et al. ............. 718/104 |
| 7,487,513 B1* | 2/2009 | Savchenko et al. ............ 719/320 |
| 7,743,150 B1* | 6/2010 | Carter et al. .................... 709/227 |
| 2002/0046239 A1* | 4/2002 | Stawikowski et al. ........ 709/203 |
| 2002/0174421 A1* | 11/2002 | Zhao et al. ..................... 717/174 |
| 2003/0005181 A1* | 1/2003 | Bau et al. ....................... 709/330 |
| 2004/0019662 A1* | 1/2004 | Viswanath et al. ............ 709/220 |
| 2004/0133656 A1* | 7/2004 | Butterworth et al. ......... 709/219 |
| 2005/0038771 A1* | 2/2005 | Sugihara et al. .................. 707/1 |
| 2005/0086360 A1* | 4/2005 | Mamou et al. ................ 709/232 |
| 2005/0262190 A1* | 11/2005 | Mamou et al. ................ 709/203 |
| 2006/0090195 A1* | 4/2006 | Pearson et al. .................... 726/3 |
| 2006/0092861 A1* | 5/2006 | Corday et al. ................. 370/256 |
| 2006/0190580 A1* | 8/2006 | Shu et al. ....................... 709/223 |
| 2007/0100861 A1* | 5/2007 | Novy ............................. 707/101 |
| 2007/0124475 A1* | 5/2007 | Syed et al. ..................... 709/226 |
| 2007/0130286 A1* | 6/2007 | Hopmann et al. ............. 709/217 |
| 2007/0201665 A1* | 8/2007 | Kocan et al. .............. 379/201.02 |

OTHER PUBLICATIONS

Farrell, J. A. et al., "Web services management approaches", IBM Systems Journal, vol. 41, No. 2, May 2002.*
O'Connell, Paul et al., "Using SOAP to Clean up Configuration Management", posted online Aug. 2002.*

* cited by examiner

*Primary Examiner* — Neveen Abel-Jalil
*Assistant Examiner* — Son T Hoang
(74) *Attorney, Agent, or Firm* — Fliesler Meyer LLP

(57) ABSTRACT

In accordance with embodiments, there are provided mechanisms and methods for providing interoperable management of application servers. These mechanisms and methods can enable a software developer to create client applications using one or more programming systems, i.e., .NET, C++, VISUAL C++, etc. that can discover and interact with management resources, such as objects, functions and so forth, deployed on an application server, such as an application server implemented using a disparate programming system, i.e., a J2EE Application server, for example. Embodiments employing interfaces that conform to an implemented standard, i.e., Web Service Description Language (WSDL), for example and conform to an implemented protocol, such as Simple Object Access Protocol (SOAP), Hyper-Text Transfer Protocol (HTTP) for example, can enable third parties, for example, to create software to monitor managed applications and/or servers.

18 Claims, 4 Drawing Sheets

INTEROPERABLE MANAGEMENT OF APPLICATION SERVERS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to application monitoring, and more particularly to a mechanism for interoperable management of application servers.

BACKGROUND

With the explosive growth of the World Wide Web in recent years, service providers have turned to the popular JAVA™ 2 Platform, Enterprise Edition ("J2EE") as a platform of choice for providing services. (JAVA™ is a trademark of Sun Microsystems, Inc.) Service providers may install applications on one or more J2EE application servers. Absent a standard for doing so, service providers often prepared custom and proprietary interfaces in order to monitor the status of the applications on the servers. Since each service provider provided a different way of doing so, confusion at the monitoring (or instrumentation layer) resulted.

One proposed solution to the confusion is the Java Specification Request (JSR) 77 standard which specifies a standard set of interfaces that service providers (and others) will use to monitor services and applications and application providers will incorporate into their applications allowing them to be monitored. One approach to implementing the JSR 77 standard calls for deploying monitoring agents at each of the servers in order to collect the specified information.

However, monitoring agents can take up significant resources on the server systems on which the agents are deployed, adding overhead and reducing performance. Accordingly, what is needed are improved mechanisms and methods for implementing interfaces for managed applications.

DETAILED DESCRIPTION

Figure 1:
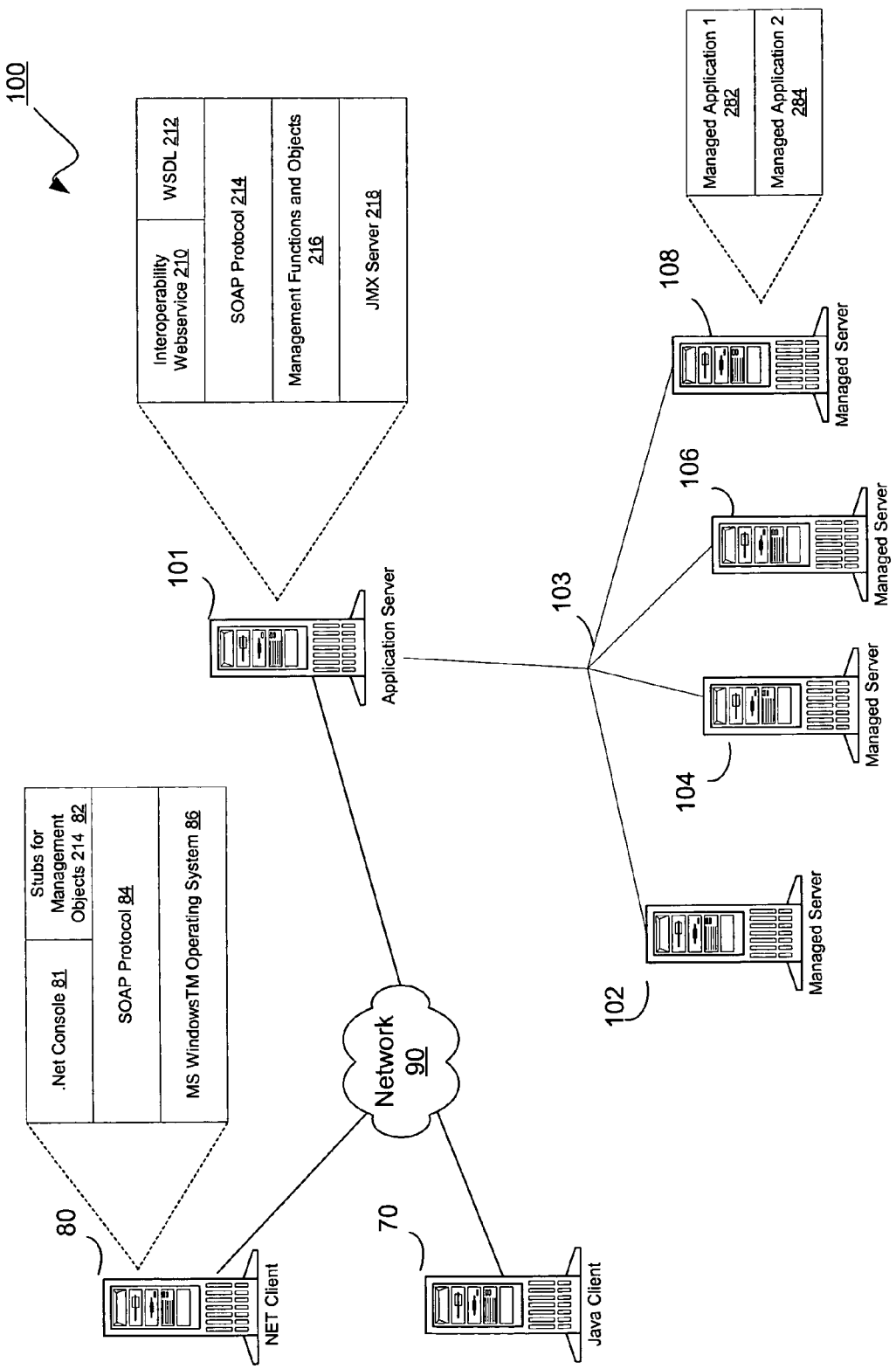
FIG. 1 is functional block diagram of an example computing environment in which techniques for interoperable management of application servers in an embodiment may be implemented.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided mechanisms and methods for providing interoperable management of application servers. These mechanisms and methods can enable a software developer to create client applications using one or more programming systems, i.e., .NET, C++, VISUAL C++, etc. that can discover and interact with management resources, such as objects, functions and so forth, deployed on an application server, such as an application server implemented using a disparate programming system, i.e., a J2EE Application server, for example. As used herein, a programming system is defined to include a computer environment provided by an operating system and/or one or more programming languages. Embodiments employing interfaces that conform to an implemented standards and protocols can enable third parties, for example, to create software to monitor managed applications and/or servers. Some examples of implemented standards usable with certain embodiments include without limitation Web Service Description Language (WSDL) for example. Some examples of implemented protocols include without limitation Simple Object Access Protocol (SOAP), Hyper-Text Transfer Protocol (HTTP) and the like.

In an embodiment and by way of example, a method for interoperable management of application servers is provided. The method embodiment includes receiving from a requestor, a request to access management functional resources in an application server. Requestors may be clients, proxies or other types of automated entities. The requestor is implemented using a first programming system and the application server is implemented using a second programming system. The second programming system can be different from the first programming system. A web service is provided at the application server to expose a mechanism to access management functional resources of the application server. For example, the web service can expose a Web Service Description Language (WSDL) format contract to access management functional resources of the application server. As used herein, the term management functional resources is defined broadly to include hardware, software and computational objects that provide or facilitate management of applications.

Services to perform management on the application server are provided to the requester. The services are created using the first programming system and provide the capability to access management functional resources implemented using the second programming system in the application server based on the mechanism exposed by the web service. As used herein, the term web service refers to a software component compatible with hypertext-linked documents such as pages on the World Wide Web, for example. Web services can be described using WSDL and be capable of being accessed via standard network protocols such as but not limited to SOAP over HTTP.

While the present invention is described with reference to an embodiment in which techniques for interoperable management of application servers are implemented in an application server in conformance with the J2EE Management Framework using executable programs written in the Java™ programming language, the present invention is not limited to the J2EE Management Framework nor the JAVA™ programming language. Embodiments may be practiced using other interconnectivity specifications or programming languages, i.e., JSP and the like without departing from the scope of the embodiments claimed. (JAVA™ is a trademark of Sun Microsystems, Inc.).

FIG. 1 is functional block diagram of an example computing environment in which techniques for interoperable management of application servers in an embodiment may be implemented. As shown in FIG. 1, a J2EE management framework 100 provides a mechanism in which one or more clients 70, 80 can manage processes executing on one or more managed servers 102-108 using a central point application server 101. A client 70, 80 can also obtain information about the application server 101.

In one embodiment, the application server 101 and the managed servers 102-108 utilize an application server product, such as WebLogic® Server by BEA systems of San Jose, Calif. A communications mechanism 103 enables application server 101 to communicate with the managed servers 102-108. Communications mechanism 103 may include a network, shared memory interface or other types of communications interconnect. While the invention is described with reference to an embodiment in which multiple machines support application server 101 and managed servers 102-108, other embodiments may include installations that comprise of a single server instance or multiple instances, each hosted on one or more physical machines. In other embodiments, application server 101 may exist as a separate process executing on the same physical machine as one or more of the managed servers 102-108.

Processing typically commences with a requester, such as client 80, for example, sending one or more requests to the application server 101 via an intermediary communications mechanism, such as a network 90. The application server 101 determines a running entity using a look up or other convenient mechanism. The running entity could be running on one or more managed server(s) 102-108. The managed server 108 then serves a result responsive to the request to the application server 101. The application server 101 creates a corresponding J2EE Managed Object (JMO) and returns the result to the requestor, client 80. The client 80 includes stubs 82 for the management objects.

In an embodiment and by way of example, the requestor, client 80, is implemented using a first programming system, such as without limitation, one of C++, VISUAL C++, C# and .NET programming system. The application server 101 may be implemented using a different programming system, such as without limitation, one of JAVA™, JAVA Management Extensions (JMX) and JAVA Messaging Service (JMS). Embodiments provide methods and mechanisms that can enable the client 80 to manage web services, for example, deployed by application server 101 even though client 80 and application server 101 may be implemented using different programming systems.

For example, in an embodiment, application server 101 implements a JMX server 218. A web service 210 provided at the application server 101 includes a mechanism to access management functional resources of the application server 101. The web service 210 can expose a Web Service Description Language (WSDL) format contract 212 to access management functional resources 216 of the JMX server 218 running on application server 101. Using a standardized protocol, such as Simple Object Access Protocol (SOAP) 214, the WSDL format contract 212 can be provided to the client 80. Based upon the WSDL contract 212, client 80 can perform management on the application server 101. Accordingly, embodiments can enable services created using a first programming system to provide the capability to access management functional resources implemented using a second programming system in the application server based on the mechanism exposed by the web service.

Continuing with the above example, client 80 implements a Microsoft Windows® operating system 86 and a .NET console 81. Client 80 may make a request of the application server 101 for a WSDL format contract that describes management functional resources of the JMX server 218 running on the application server 101. The client 80 makes this request using standardized protocol, such as Simple Object Access Protocol (SOAP) 84. The client 80 detects management functional resources exposed using a web service 212 and received from the application server using a standardized protocol such as SOAP. The client 80 accesses the management functional resources implemented on the application server 101 based on the mechanism exposed by the web service.

Resources at the one or more managed servers 102-108 provide for application execution and return of results to the client 70, 80. For example, server 108 includes a managed application 1 284 and a managed application 2 284 that can be managed by the application server 101. Other applications (not shown for brevity) may exist on server 108. Embodiments can provide the application server 101 the capability to provide monitoring information to a standardized interface compatible with the client 80.

While the present invention is described with reference to an embodiment in which managing J2EE applications that are executable programs written in the JAVA™ programming language and usually (though not always) executed in response to an invocation from an HTML page, the present invention is not limited to the JAVA™ programming language and may be practiced using other programming languages, i.e., JSP and the like without departing from the scope of the embodiments claimed.

Figure 2A:
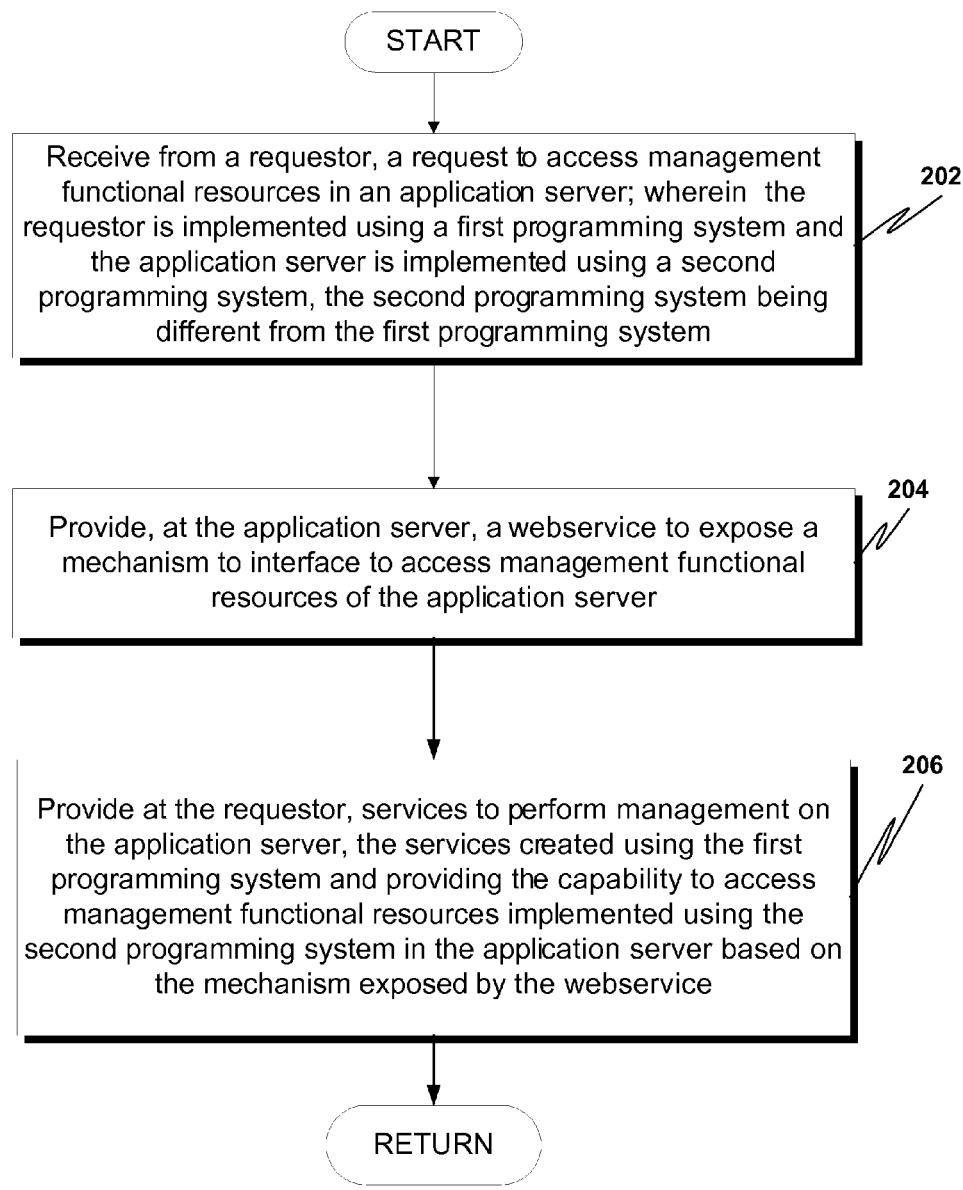
FIG. 2A is an operational flow diagram illustrating a high level overview of a technique for interoperable management of application servers in an embodiment.

FIG. 2A is an operational flow diagram illustrating a high level overview of a technique for interoperable management of application servers in an embodiment. The technique for managing J2EE applications shown in FIG. 2A is operable with an application server, such as application server 101 of FIG. 1, for example. As shown in FIG. 2A, a request to access management functional resources in an application server is received from a requestor (block 202). The requestor is implemented using a first programming system and the application server is implemented using a second programming system. The second programming system can be different from the first programming system. For example, the first programming system may be, without limitation, one of C++, VISUAL C++, C# and .NET programming system. The second programming system may be, without limitation, one of JAVA™, JAVA Management Extensions (JMX) and JAVA Messaging Service (JMS). A web service can be provided at the application server to expose a mechanism to access management functional resources of the application server (block 204). For example, the web service can expose a Web Service Description Language (WSDL) format contract to access management functional resources of the application server. Services to perform management on the application server are provided to the requestor (block 206). The services may be created using the first programming system but provide the capability to access management functional resources implemented using the second programming system in the application server based on the mechanism exposed by the web service.

Figure 2B:
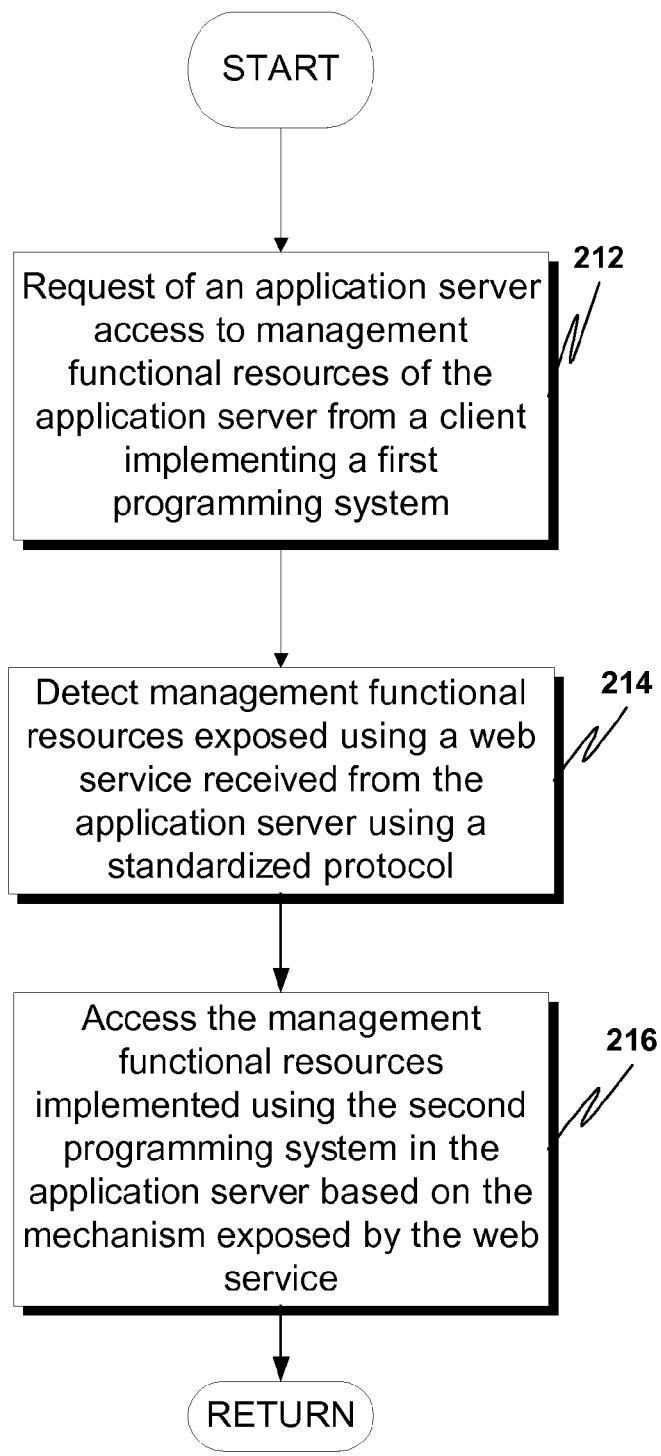
FIG. 2B is an operational flow diagram illustrating a high level overview of a technique for interoperable management of application servers in an embodiment.

FIG. 2B is an operational flow diagram illustrating a high level overview of a technique for accessing a web service in an application server in an embodiment. The technique for accessing a web service in an application server shown in FIG. 2B is operable with client, such as client 80 of FIG. 1, for example. As shown in FIG. 2B, a requester requests of an application server access to management functional resources of the application server (block 212). The requestor detects management functional resources exposed using a web service received from the application server using a standardized protocol (block 214). The requestor accesses the management functional resources implemented using the second programming system in the application server based on the mechanism exposed by the web service (block 216).

In other aspects, the invention encompasses in some embodiments, computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to providing mechanisms and methods for managing J2EE applications as discussed herein.

Figure 3:
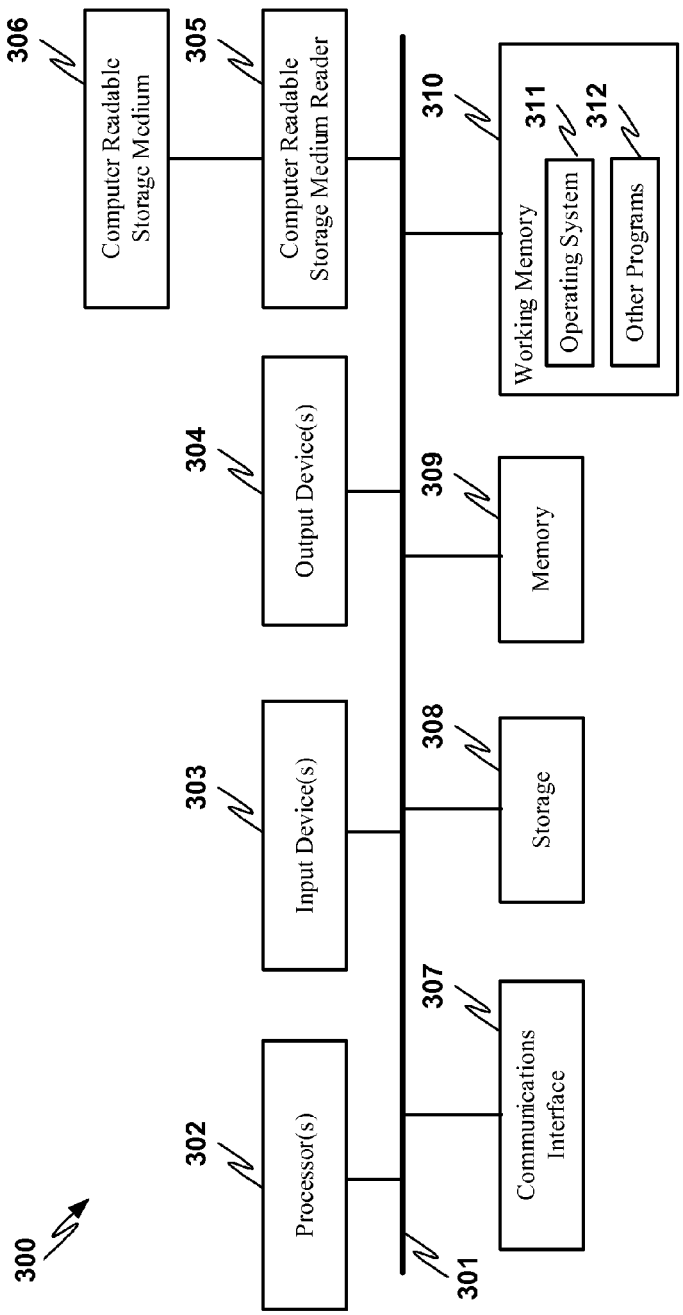
FIG. 3 is a hardware block diagram of an example computer system, which may be used to embody one or more components in accordance with an embodiment.

FIG. 3 illustrates an exemplary processing system 300, which can comprise one or more of the elements of FIG. 1. Turning now to FIG. 3, an, exemplary computing system is illustrated that may comprise one or more of the components of FIG. 1. While other alternatives might be utilized, it will be presumed for clarity sake that components of the systems of FIG. 1 are implemented in hardware, software or some combination by one or more computing systems consistent therewith, unless otherwise indicated.

Computing system 300 comprises components coupled via one or more communication channels (e.g., bus 301) including one or more general or special purpose processors 302, such as a Pentium®, Centrino®, Power PC®, digital signal processor ("DSP"), and so on. System 300 components also include one or more input devices 303 (such as a mouse, keyboard, microphone, pen, and so on), and one or more output devices 304, such as a suitable display, speakers, actuators, and so on, in accordance with a particular application. (It will be appreciated that input or output devices can also similarly include more specialized devices or hardware/software device enhancements suitable for use by the mentally or physically challenged).

System 300 also includes a computer readable storage media reader 305 coupled to a computer readable storage medium 306, such as a storage/memory device or hard or removable storage/memory media; such devices or media are further indicated separately as storage 308 and memory 309, which may include hard disk variants, floppy/compact disk variants, digital versatile disk ("DVD") variants, smart cards, read only memory, random access memory, cache memory, and so on, in accordance with the requirements of a particular application. One or more suitable communication interfaces 307 may also be included, such as a modem, DSL, infrared, RF or other suitable transceiver, and so on for providing inter-device communication directly or via one or more suitable private or public networks or other components that may include but are not limited to those already discussed.

Working memory 310 further includes operating system ("OS") 311 elements and other programs 312, such as one or more of application programs, mobile code, data, and so on for implementing system 300 components that might be stored or loaded therein during use. The particular OS or OSs may vary in accordance with a particular device, features or other aspects in accordance with a particular application (e.g. Windows®, WindowsCE™, Mac™, Linux, Unix or Palm™ OS variants, a cell phone OS, a proprietary OS, Symbian™, and so on). Various programming languages or other tools can also be utilized, such as those compatible with C variants (e.g., C++, C#), the JAVA™ 2 Platform, Enterprise Edition ("J2EE") or other programming languages in accordance with the requirements of a particular application. Other programs 312 may further, for example, include one or more of activity systems, education managers, education integrators, or interface, security, other synchronization, other browser or groupware code, and so on, including but not limited to those discussed elsewhere herein.

When implemented in software (e.g. as an application program, object, agent, downloadable, servlet, and so on in whole or part), a learning integration system or other component may be communicated transitionally or more persistently from local or remote storage to memory (Static Random Access Memory (SRAM), cache memory, etc.) for execution, or another suitable mechanism can be utilized, and components may be implemented in compiled or interpretive form. Input, intermediate or resulting data or functional elements may further reside more transitionally or more persistently in a storage media, cache or other volatile or non-volatile memory, (e.g., storage device 308 or memory 309) in accordance with a particular application.

Other features, aspects and objects of the invention can be obtained from a review of the figures and the claims. It is to be understood that other embodiments of the invention can be developed and fall within the spirit and scope of the invention and claims. The foregoing description of preferred embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A computer-implemented method for interoperable management of an application server, the method comprising:
   receiving from a client requestor using Simple Object Access Protocol (SOAP), a request for a web services description language (WSDL) contract from a central point application server, wherein the central point application server manages a set of managed servers having applications executing thereon, and, wherein the client requestor is implemented in a different programming system from a native programming system of a remote application on a managed server;
   transmitting, using SOAP, the WSDL contract to the client requestor in response to the request, wherein the client requestor receives the WSDL contract and detects a set of management functions on the central point application server based on the WSDL contract;
   receiving, from the client requestor, a request to access a management function exposed by the WSDL on the central point application server;
   determining, using a lookup by the central point application server, the remote application executing on the managed server based on said request to access the management function wherein the managed server and the remote application are implemented using the native programming system;
   creating a Java Managed Object (JMO) on the central point application server, the JMO accessing the management function of the remote application executing on the managed server;
   instantiating, on the client requestor, a stub for the JMO implementing the management function of the remote application, said management function exposed by the WSDL contract;
   transmitting monitoring information of the remote application from the central point application server to the client requestor over a connection between the JMO and the stub, such that the client requestor accesses the monitoring information of the remote application on the managed server without a monitoring agent on the remote managed server.

2. The computer-implemented method of claim 1, wherein the managed application is an executable program written in the Java™ programming language and executed in response to an invocation from an HTML page.

3. The computer-implemented method of claim 1, wherein resources at one or more managed servers provide for application execution and return of results to a client.

4. The computer-implemented method of claim 1, wherein the WSDL contract exposes access to the management function of a Java Management Extensions (JMX) server running on the central application server.

5. The computer-implemented method of claim 1, wherein a plurality of clients manage processes executing on one or more managed servers using the central point application server.

6. The computer-implemented method of claim 1, wherein a network, shared memory interface or other type of communications interconnect enables the central point application server to communicate with one or more managed servers.

7. A computer readable storage medium storing one or more sequences of instructions for implementing interoperable management of an application server, which instructions, when executed by one or more processors, cause the one or more processors to carry out the steps of:
   receiving from a client requestor using Simple Object Access Protocol (SOAP), a request for a web services description language (WSDL) contract from a central point application server, wherein the central point application server manages a set of managed servers having applications executing thereon, and, wherein the client requestor is implemented in a different programming system from a native programming system of a remote application on a managed server;
   transmitting, using SOAP, the WSDL contract to the client requestor in response to the request, wherein the client requestor receives the WSDL contract and detects a set of management functions on the central point application server based on the WSDL contract;
   receiving, from the client requestor, a request to access a management function exposed by the WSDL on the central point application server;
   determining, using a lookup by the central point application server, the remote application executing on the managed server based on said request to access the management function wherein the managed server and the remote application are implemented using the native programming system;
   creating a Java Managed Object (JMO) on the central point application server, the JMO accessing the management function of the remote application executing on the managed server;
   instantiating, on the client requestor, a stub for the JMO implementing the management function of the remote application, said management function exposed by the WSDL contract;
   transmitting monitoring information of the remote application from the central point application server to the client requestor over a connection between the JMO and the stub, such that the client requestor accesses the monitoring information of the remote application on the managed server without a monitoring agent on the remote managed server.

8. The computer readable storage medium of claim 7, wherein the managed application is an executable program written in the Java™ programming language and executed in response to an invocation from an HTML page.

9. The computer readable storage medium of claim 7, wherein resources at one or more managed servers provide for application execution and return of results to a client.

10. The computer readable storage medium of claim 7, wherein the WSDL contract exposes access to the management function of a Java Management Extensions (JMX) server running on the central application server.

11. The computer readable storage medium of claim 7, a plurality of clients manage processes executing on one or more managed servers using the central point application server.

12. The computer readable storage medium of claim 7, wherein a network, shared memory interface or other type of communications interconnect enables the central point application server to communicate with one or more managed servers.

13. A system for interoperable management of application servers, said system comprising:
  a computer readable storage medium storing a set of instructions; and
  one or more processors that execute said set of instructions to perform the steps of:
    receiving from a client requestor using Simple Object Access Protocol (SOAP), a request for a web services description language (WSDL) contract from a central point application server, wherein the central point application server manages a set of managed servers having applications executing thereon, and, wherein the client requestor is implemented in a different programming system from a native programming system of a remote application on a managed server;
    transmitting, using SOAP, the WSDL contract to the client requestor in response to the request, wherein the client requestor receives the WSDL contract and detects a set of management functions on the central point application server based on the WSDL contract;
    receiving, from the client requestor, a request to access a management function exposed by the WSDL on the central point application server;
    determining, using a lookup by the central point application server, the remote application executing on the managed server based on said request to access the management function wherein the managed server and the remote application are implemented using the native programming system;
    creating a Java Managed Object (JMO) on the central point application server, the JMO accessing the management function of the remote application executing on the managed server;
    instantiating, on the client requestor, a stub for the JMO implementing the management function of the remote application, said management function exposed by the WSDL contract;
    transmitting monitoring information of the remote application from the central point application server to the client requestor over a connection between the JMO and the stub, such that the client requestor accesses the monitoring information of the remote application on the managed server without a monitoring agent on the remote managed server.

14. The system of claim 13, wherein the managed application is an executable program written in the Java programming language and executed in response to an invocation from an HTML page.

15. The system of claim 13, wherein the WSDL contract exposes access to the management function of a Java Management Extensions (JMX) server running on an application server.

16. The system of claim 13, wherein a plurality of clients manage processes executing on one or more remote managed servers using the central point application server.

17. The system of claim 13, wherein a network, shared memory interface or other type of communications interconnect enables the central point application server to communicate with one or more managed servers.

18. The system of claim 13, wherein the native programming system is one of: Java, Java Management Extensions (JMX) and Java Messaging Service (JMS), and wherein the programming system of the client requestor is one of: .NET, Visual C++, and C++.

* * * * *

UNITED STATES PATENT AND TRADEMARK OFFICE
CERTIFICATE OF CORRECTION

PATENT NO.         : 7,908,294 B2                                     Page 1 of 1
APPLICATION NO.    : 11/340754
DATED              : March 15, 2011
INVENTOR(S)        : Ansari It is certified that error appears in the above-identified patent and that said Letters Patent is hereby corrected as shown below:

In column 3, line 2, delete "requester." and insert -- requestor. --, therefor.

In column 3, line 50, delete "requester," and insert -- requestor, --, therefor.

In column 3, line 51, delete "80," and insert -- 80 --, therefor.

In column 5, line 24, delete "requester" and insert -- requestor --, therefor.

In column 6, line 8, delete "an," and insert -- an --, therefor.

Signed and Sealed this
Fourth Day of October, 2011

David J. Kappos
*Director of the United States Patent and Trademark Office*